United States Patent
Conner

[15] 3,698,555
[45] Oct. 17, 1972

[54] SELF-CLEANING FILTER SYSTEM

[72] Inventor: John R. Conner, 2210 Tupelo Road, Orlando, Fla. 32808

[22] Filed: Nov. 23, 1970

[21] Appl. No.: 91,661

[52] U.S. Cl. ............... 210/138, 210/169, 210/304, 210/410
[51] Int. Cl. ......................................... B01d 29/38
[58] Field of Search...... 210/112, 138, 169, 303, 304, 210/307, 311, 313, 410

[56] References Cited

UNITED STATES PATENTS

| | | | |
|---|---|---|---|
| 829,503 | 8/1906 | Cady | 210/349 |
| 1,471,807 | 10/1923 | Roosevelt et al. | 210/304 |
| 1,780,774 | 11/1930 | White | 210/304 |
| 2,383,672 | 8/1945 | Neisingh | 210/410 |
| 2,779,477 | 1/1957 | Swensen | 210/138 |
| 3,389,797 | 6/1968 | Giardini | 210/138 |
| 3,581,895 | 6/1971 | Howard et al. | 210/138 X |

Primary Examiner—John Adee
Attorney—Alexander & Dowell

[57] ABSTRACT

A filter system including permeable-surface filter means preceeded by cyclone-separator means and fitted with an electrically operated drain valve at the bottom of a specially shaped dirt trap, the electrically operated valve, an air-admitting check valve and an air volume tank being combined with pumping-cycle timer means to provide an automatic self-cleaning system in which a pumping and filtering cycle alternates with a filter-cleaning cycle to provide a frequently-cleaned efficient system especially useful for swimming pool filtration.

8 Claims, 4 Drawing Figures

INVENTOR.
JOHN R. CONNER
BY
Alexander & Dowell
ATTORNEYS

SELF-CLEANING FILTER SYSTEM

This invention relates to self-cleaning filter systems for removing solid particles from liquids in which they are entrained, and in particular relates to improvements in filter systems intended for the filtration of swimming pool water to remove debris and dirt therefrom.

Prior art swimming pool filters are generally of the permeable-surface strainer type in which the total surface area exposed to the water flow determines the capacity of the filter to collect solid particles and hold them. In general, the bigger and more expensive the filter, the more particles it can collect and the less frequently it must be cleaned. Cleaning is a substantial problem. With regard to those filter systems which require disassembly for cleaning, most are difficult to reassemble, and, since frequent cleaning is necessary, the wear and tear on the threaded engagements prevents the parts from lasting very long. Moreover, because of progressive clogging, these filters operate on declining liquid-flow and efficiency characteristics. In an effort to make it easier to clean the filters as often as they require, some pool filter systems have been provided with elaborate valve and pump circuits designed to accomplish backwashing of the filter surfaces, usually resulting in the discharge of large quantities of water into the public sewer system with resulting waste of water and pool chemicals. Some of the filter flushing systems not only use hand-operated pumps, but still require partial disassembly of the filters when cleaning them. Many prior art backwashing systems can be automated, but the expense is high, and the systems are often complex and suffer from high maintenance costs.

It is a major object of this invention to provide a novel filter system in which permeable-surface filters are preceeded by a cyclone separator system which removes a large proportion of the dirt and debris, even the smaller particles, before they ever reach the permeable-surface filters.

It is another major object of this invention to provide a combined filter system as set forth above which is also self-cleaning. More particularly, it is an object of the invention to provide a system which wastes only a small quantity of water each time it is cleaned and which can, therefore, be cleaned relatively more often than more wasteful prior-art systems, so as to maintain its operating efficiency continuously at a high level. The vortex or cyclone-separator type of dirt removal filter requires a relatively high rate of flow in order to produce the centrifugal forces necessary to separate the solid particles. It is, therefore, desirable to keep the internal volume of the filter relatively low, within limits, so as to produce a high flow rate in the filter. Since the filter is relatively small, it is more easily installed and more economical to manufacture. Its relatively smaller liquid capacity is what makes it more economical to backwash, whereby it can be cleaned more frequently without excessive waste.

Most swimming pool pumping systems already have automatic timers on them to turn them on and off. The present self-cleaning filter has an electrically-operated valve which combines with air stored under pressure to provide high velocity backwashing, and this combination adapts the system especially for use with a short pumping cycle together with a brief cleaning cycle which automatically takes place each time the power to the pump is shut off.

It is another important object of the present invention to provide a novel filter structure in which an air volume is compressed in an auxiliary tank by the head of water in the filter which builds up when the swimming pool filtration pump is running, and which upon stopping of the pump creates a reverse-flow backwashing surge through the filter cartridges to dislodge the entrapped particles and free them to fall into the bottom of the main cyclone separator chamber. At the same time, an electrically operated valve is opened in the bottom of the chamber and an air-admitting check valve drops open in the top of the chamber, thereby creating a strong downward flow of water to flush out the debris collected in the bottom thereof. The opening of the check valve in the top of the tank to admit air not only allows rapid flushing of the chamber, but also prevents any tendency of the system to syphon water from the pool through the interconnecting water pipes.

It is another important object of the invention to shape the lower portion of the cyclone separator chamber in such a way as to provide a stepped trap which catches and holds the dirt and prevents it from being re-entrained in the upwardly flowing water in the center of the separator while the pump is still running, the upwardly flowing water then passing through the permeable-surface filter cartridges. In the present illustrative embodiment four 20 micron Harmsco cartridges are used.

It is another important object of the invention to provide an improved swimming pool filter which is compactly built, and which includes both permeable surface type filters and a cyclone separator type of filter combined and mutually oriented in an optimum manner so that the cyclone separator can act both to catch vortex-separated particles when the pump is running and to catch particles dislodged from the permeable surface cartridges when the pump is stopped and they are backwashed, a common valve at the bottom of the separator chamber serving to remove the debris caught in this manner by both types of filters. The present invention lends itself especially well to automation in view of the fact that a minimum of moving parts has been added, namely a simple mechanical check valve to admit air into the top of the cyclone separator chamber, and a simple electrically operated valve at the bottom of the chamber.

Other objects and advantages of the invention will become apparent during the following discussion of the drawing, wherein.

Figure 4:
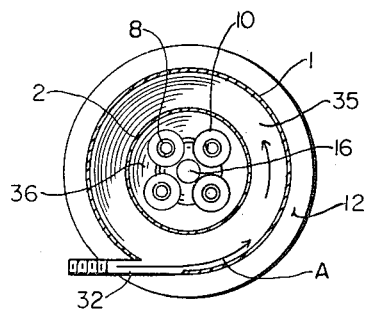
FIG. 4 is a section view taken along the line 4—4 of FIG. 3.

Referring now to the drawing, the present filter system includes the filter itself, having an outer shell 1 and an inner shell 2 which are frustoconical and are concentrically disposed with respect to each other. The outer shell 1 is closed by an integral ring 3 at its top, the ring having an opening through which the inner shell 2 passes, the latter being annularly secured to the ring 3 for support. At the top of the inner shell 2 there is a dished head cover 5 having a flanged 5a which engages a flange 2a located at the top of the inner shell 2. A suitable annular clamp ring 6 maintains these members in closed relationship, the filter cartridge support plate 7 being compressed between suitable gasket means by the flanges 5a and 2a. The plate 6 has a number of openings through it, each of which supports a pipe 8 secured at its mouth and extending downwardly to support a filter element 10 which slides over the pipe. A suitable closure cap 9 is provided at the lower end of each pipe to retain the filter element mounted thereon, and each of the pipes 8 is perforated at frequent intervals along its length so that water which passes from the outside through the filter element can also pass through the holes in the pipes 8 and into the space 11 within the dome located under the dished cover 5. This specific mounting and support for the filter cartridges is well known and is not considered inventive in the present disclosure.

At the lower end of the outer shell 1 there is secured another ring 12 which can be welded to the shell at its inner annulus, and at its outer periphery to the conical wall of a dirt trap shell 15. The dirt trap shell 15 at its lower end joins an outlet pipe 16 which is coupled to a solenoid operated valve 17, which may be of the normally open variety, closed by the solenoid 17a when the latter is energized. The bottom of the valve housing 17 joins another pipe 18 which is preferably connected to a sewer in order to discharge dirt laden water coming from the filter when the valve 17 is opened.

At the top of the dished head cover 5 there is located a tube 20 which connects with an air volume receptacle which in this illustrative embodiment takes the form of a tank 21 for the purpose hereinafter explained. In the center of the dished head cover 5 there is an upwardly extending outlet pipe 23 which connects to a pipe TEE 24 and to another pipe 25 which returns filtered water to the swimming pool. The TEE has a check valve 27 coupled to its upper end, the check valve being normally open except when water is being pumped under pressure through the filter system. When the flow of water stops and the pressure within the system falls, the check valve 27 drops open to admit air in the direction of the arrow 26 into the filter.

Figure 2:
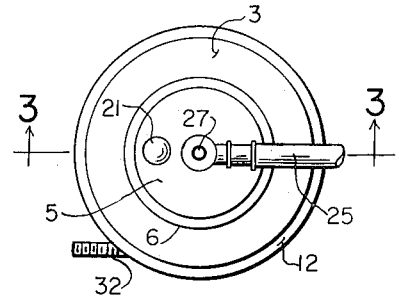
FIG. 2 is a plan view of the filter shown in FIG. 1.
Figure 3:
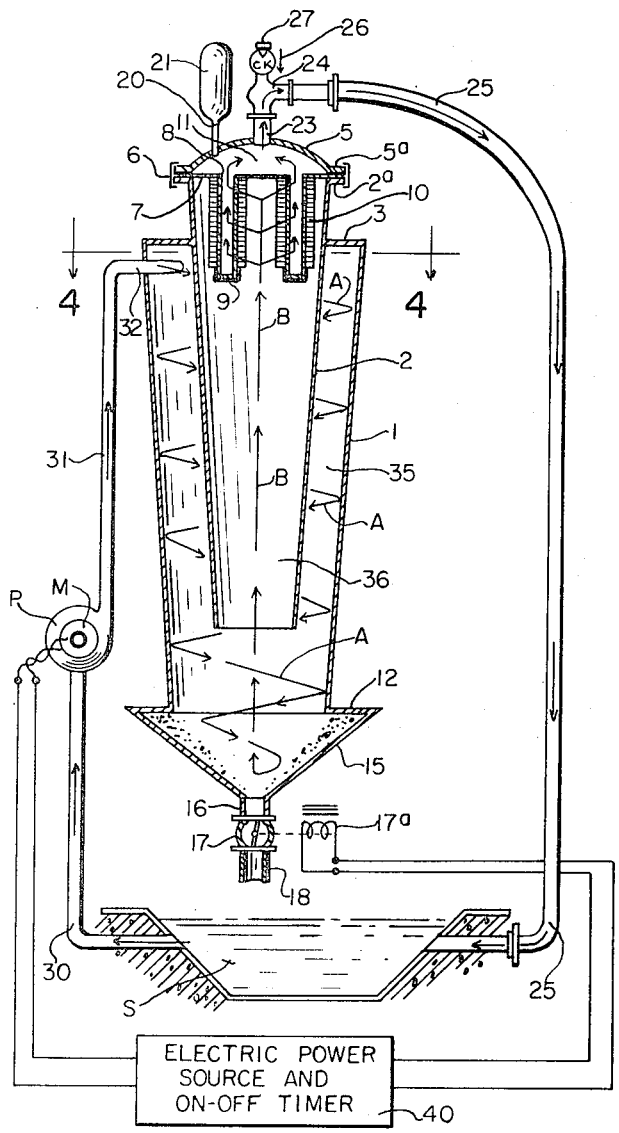
FIG. 3 is a section view taken along the line 3—3 of FIG. 2, FIG. 3 additionally showing a swimming pool and an electrical timer connected to the filter system to illustrate the manner in which it normally operates.
Figure 1:
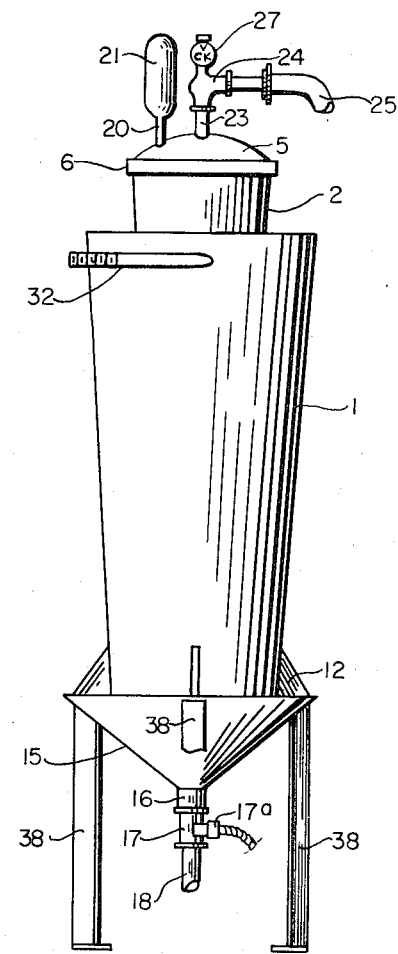
FIG. 1 is an elevation view of a filter according to the present invention.

Water from the swimming pool S is pumped through the pipe 30 and through the pump P upwardly through a pipe 31 and into the inlet pipe 32 entering into the filter through the outer shell 1 in a tangential direction. The inlet pipe 32 can best be seen in FIGS. 1, 2 and 4, and introduces water into the outer chamber 35 so as to produce a swirling action therein in the direction indicated by the arrows A shown in FIGS. 3 and 4. The swirling water goes to the bottom of the outer shell 1 where it reverses and travels upwardly in the direction of the arrows B through the center of the inner chamber 36 and eventually passes through the filters 10 and through the holes in the pipes 8 and into the dome space 11 above the filters. The water then passes through the pipes 23 and 25 and re-enters the swimming pool S as shown at the bottom of FIG. 3.

In a practical installation, the filter assembly described thus far could either be supported on its inlet, outlet and drainage pipes, or else it can stand on legs 38 which can be provided at their lower ends with lugs so that they can be bolted to the floor.

The pump P is driven by an electric motor M from some suitable source of electrical power 40 which also includes a cyclic ON-OFF timer. This timer is found in many presently existing swimming pool installations and serves the purpose of controlling the cycle of the pump P so that it does not run continuously. Generally, the timer in a practical embodiment will be adjusted so that it operates for a length of time extending from a few minutes to several hours, and then shuts off. This off-period in the present system should be at least adequate to permit the backwashing and draining of the filter through the drainage valve 17 and into the sewer through the pipe 18. The valve 17 can either be of the normally-open variety which is then closed by action of the solenoid 17a whenever the pump is running and the motor M is energized, or else the valve 17 can be of the normally closed variety which is opened by solenoid action by an output from the timer 40 during alternate periods when the pump motor M is not running. Either way, the arrangement should be such that when the motor runs the valve 17 is closed and when the motor stops the valve 17 is opened.

OPERATION

The filter operates for its principal purpose, namely to remove dirt and debris from the swimming pool water, whenever the pump M is being run by the electrical source and timer 40. The water is drawn from the swimming pool S through the pipe 30 and is introduced under pressure into the pipe 31. The water is thereupon jetted at a high rate through the inlet pipe 32 so that it tangentially enters the outer chamber 35 near its upper end and swirls downwardly along the arrow A as shown in FIGS. 3 and 4. The water rapidly circulates counter-clockwise in the present embodiment and travels downwardly between the outer shell 1 and the inner shell 2 which together form the walls of the outer chamber 35. A considerable portion of the dirt is thrown outwardly by centrifical force against the surface of the shell 1, and the dirt then migrates downwardly along this shell. When eventually the dirt goes below the plate 12, it is thrown outwardly into the dirt trap shell where it tends to accumulate below the step formed by the plate 12 and the shell 15. As the water reaches the bottom of the chamber it reverses its direction and travels generally upwardly in the direction of the arrows B, probably with a residual swirling motion which is not shown in the present drawing in order to simplify the illustration. The water then passes through the filter cartridges 10 and into the dome space 11.

The water in the dome 11 is still under pressure introduced by the pump, and therefore, rises into the tube 20 and probably part-way into the air chamber tank 21 so as to compress the air which is entrapped therein to create and maintain a static pressure head. Most of the water, however, travels upwardly through the pipe 23 and the TEE 24 and out into the pipe 25 where it is re-introduced into the swimming pool S. Although in the present illustration the filter is shown as located above the swimming pool S, in a practical installation the filter would probably be adjacent to the pool or under it. The cyclone separation action in the outer chamber 35 coupled with the filtering action of the cartridges 10 will remove particles from the water so long as the pump is running. However, when the pumping cycle terminates and the timer turns the pump off, the valve 17 opens at the bottom of the dirt trap shell 15 and the water suddenly surges downwardly and out through the pipe 18. The gravitational component of this surge is strongly augmented by the air-pressure built up in the air volume tank 21, whereby the water in the upper dome 11 is flushed at a high volumetric rate, although for only a short period of time, downwardly through the filter cartridges 10 so as to dislodge dirt held on their surfaces and allow the dirt to pass downwardly through the inner chamber 36 and through the dirt trap shell 15 and the valve 17 into the sewer.

As pointed out above in this specification, it is undesirable to flush any more water through the filter shells than is necessary to wash them out, and this only requires the quantity of water already contained in the dome 11 and in the chambers 35 and 36. Therefore, the outlet pipe should extend above the level of the water in the swimming pool S and the check valve 27 should also be located above the swimming pool water level so that when the pressure is removed from the system by stopping the pump motor M, the check valve 27 will open and thereby permit entry of air into the system for two purposes. The free entry of air permits the water to flow rapidly out of the chambers 35 and 36 and thereby provides a good scrubbing action to dislodge and carry dirt from the dirt trap shell 15 into the drain pipe 16. The other purpose of the check valve 27 is to prevent syphoning of water through the pipe 25 from the swimming pool S so that water from the pool is not wasted by unnecessarily running it out through the filter and through the drain pipe 16. Thus, no more water is lost each time the system flushes itself than the quantity of water contained within the filter shells 1, 2 and 15, and in the dome 11.

The above described embodiment of the invention is provided for only illustrative purposes, and is not intended to limit the scope of the following claims.

I claim:

1. A self-cleaning filter system for removing dirt from a liquid being pumped through the system by intermittently operative pumping means, comprising:
    a. inner and outer shell means vertically disposed and secured together in spaced relation to form an inner and an outer chamber communicating with each other at their lower ends;
    b. liquid inlet means connected to the pumping means and entering the outer chamber at an angle to cause the liquid to swirl downwardly through the outer chamber before entering and rising in the inner chamber;
    c. permeable-surface filter means in the upper end of the inner chamber to receive liquid rising therein, the filter means communicating with an enclosed space adjacent to the inner chamber to introduce filtered liquid thereinto;
    d. an air volume receptacle located above said enclosed space and coupled therewith such that liquid pressure in the said space will compress the air in the receptacle;
    e. liquid outlet means extending from the enclosed space at a level below said air volume receptacle and including means for selectively admitting outside air thereinto when the pumping means is not operative and;
    f. automatic valve means responsive to the operativeness of the pumping means to open the lower end of said chambers when the pumping means is not operative and to close the lower end of said chambers when the pumping means is operative.

2. In a filter system as set forth in claim 1, a dirt trap coupled at its lower end to said automatic valve means and having walls sloping upwardly and outwardly beyond the lower end of said outer shell, and horizontal plate means coupling the dirt trap to said outer shell to provide in the outer chamber a peripheral outward step where the outer shell joins the dirt trap.

3. In a filter as set forth in claim 2, the lower end of the inner shell terminating within the outer shell above the dirt trap.

4. In a filter system as set forth in claim 2, said inner shell and said outer shell and the walls of said dirt trap all being frustoconical about a common axis;

5. The filter system as set forth in claim 1, wherein said pumping means is electric-motor driven and said automatic valve means comprises an electrically operated valve, electric timer means coupled to said pumping means and to said valve means and cyclically operative alternately to close the valve means and operate the pumping means, and then to stop the pumping means and open the valve means.

6. In a filter system as set forth in claim 1, said liquid outlet means extending to an elevational level above the said enclosed space and above the inner chamber, and said means for admitting outside air comprising a check valve at said level and operative to close and be held closed by liquid under pressure when said pumping means is operative.

7. In a system as set forth in claim 1, said permeable surface filter means being mounted to a supporting plate overlying the inner chamber, and said enclosed space comprising a cover overlying the plate in spaced relation thereto and sealed to the chamber, said outlet means comprising a branched pipe extending upwardly from the cover and having a check valve in one branch, the check valve comprising said outside air admitting means.

8. In a system as set forth in claim 7, said air volume receptacle comprising a tank located above the cover and communicating with the space therewithin through a pipe.

* * * * *